(12) United States Patent
Ainapure et al.

(10) Patent No.: US 11,866,147 B2
(45) Date of Patent: Jan. 9, 2024

(54) ELECTROMAGNETIC WINDSHIELD WIPER SYSTEM

(71) Applicant: Rosemount Aerospace Inc., Burnsville, MN (US)

(72) Inventors: Mahesh Ainapure, Karnataka (IN); Nitin Kumar Goyal, Karnataka (IN); Ashutosh Kumar Jha, Karnataka (IN); Michael William Madsen, Eagan, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 373 days.

(21) Appl. No.: 17/357,438

(22) Filed: Jun. 24, 2021

(65) Prior Publication Data
US 2022/0033052 A1  Feb. 3, 2022

(30) Foreign Application Priority Data

Jul. 29, 2020  (IN) .............................. 202041032475

(51) Int. Cl.
| | |
|---|---|
| *H02K 11/33* | (2016.01) |
| *B64C 1/14* | (2006.01) |
| *B60S 1/34* | (2006.01) |
| *B60S 1/08* | (2006.01) |
| *B60S 1/44* | (2006.01) |
| *B60S 1/04* | (2006.01) |

(52) U.S. Cl.
CPC .............. *B64C 1/1484* (2013.01); *B60S 1/08* (2013.01); *B60S 1/3404* (2013.01); *B60S 1/44* (2013.01); *B60S 1/0402* (2013.01)

(58) Field of Classification Search
CPC ............. B60S 1/08; B60S 1/3404; B60S 1/44
See application file for complete search history.

(56) References Cited

U.S. PATENT DOCUMENTS

| | | |
|---|---|---|
| 5,889,341 A | 3/1999 | Kilker |
| 9,085,283 B2 | 7/2015 | Lieven |
| 2008/0196191 A1 | 8/2008 | Jeuffe et al. |
| 2019/0023228 A1* | 1/2019 | Santyar ................... B60S 1/163 |
| 2019/0270431 A1 | 9/2019 | Clift et al. |

FOREIGN PATENT DOCUMENTS

EP  3096987 A1  11/2016

OTHER PUBLICATIONS

Extended European Search Report for EP Application No. 21188601.5, dated Dec. 21, 2021, pp. 7.
First Communication Pursuant to Article 94(3) EPC for EP Application No. 21188601.5, dated Jun. 6, 2023, pp. 5.

\* cited by examiner

*Primary Examiner* — Muhammad S Islam
(74) *Attorney, Agent, or Firm* — Kinney & Lange, P. A.

(57) ABSTRACT

A windshield wiper system for use on an aircraft includes a controller and a wiper assembly including a wiper arm, a wiper blade, and a moving block. Further, the windshield wiper system includes a rail assembly including a rail assembly rack, a plurality of electromagnets, and an electrical interface. The electrical interface and the plurality of electromagnets induce a force on the moving block of the wiper assembly, causing the wiper assembly to sweep across the windshield of the aircraft. The controller is coupled to the rail assembly and the controller is configured to direct the motion of the wiper assembly through command signals to the rail assembly.

20 Claims, 4 Drawing Sheets

ELECTROMAGNETIC WINDSHIELD WIPER SYSTEM

CROSS-REFERENCE TO RELATED APPLICATION(S)

This application claims the benefit of Indian Provisional Application No. 202041032475 filed Jul. 29, 2020 for "ELECTROMAGNETIC WINDSHIELD WIPER SYSTEM" by M. Ainapure, N. K. Goyal, A. K. Jha and M. W. Madsen.

BACKGROUND

The present disclosure relates to windshield wiper systems used on an aircraft, and in particular to an electromagnetic windshield wiper system used on an aircraft.

Aircraft windshield wiper systems are used to wipe and clean water or other debris from an aircraft windshield, allowing better visibility out the windshield for both the pilot and co-pilot. Typical windshield wiper systems include components positioned within the aircraft such as a motor, motor converter, electronic control unit, and other components configured to drive motion of the wiper arm and attached wiper blade. The motor and motor converter include many interacting mechanical components, resulting in significant friction and wear and tear on the components. Ultimately, the friction and wear and tear results in a need to repair or replace the interacting mechanical components of the windshield wiper system.

In addition, traditional windshield wiper systems are configured to clean the windshield of the aircraft by sweeping in an arc across the windshield. The arced sweep is achieved by pivoting each wiper arm and wiper blade about a pivot point near the base of the wiper arm. The arced sweep of traditional windshield wiper systems is only capable of cleaning a small portion of the aircraft windshield, leaving water or other debris on a large portion of the windshield. As such, the pilot and co-pilot have a narrow field of view and many blind spots during periods of dust, drizzle, rain, sleet, snow, ice pellets, graupel, and/or hail. The airline industry is in search of an improved windshield wiper system that cleans a wider area of an aircraft windshield, creating a better field of view for both the pilot and co-pilot, and a power efficient windshield wiper system with low wear and tear characteristics, requiring less maintenance.

SUMMARY

A windshield wiper system, for use on a windshield of an aircraft, includes a wiper assembly and a rail assembly. The wiper assembly includes a wiper arm, a wiper blade, and a moving block. The wiper blade is coupled to a first end of the wiper arm and the moving block is coupled to a second end of the wiper arm. The rail assembly includes a rail assembly rack, an electrical interface coupled to the rail assembly rack, and a plurality of electromagnets positioned within and coupled to the rail assembly rack. The electrical interface is configured to provide electrical energy to the plurality of electromagnets and the plurality of electromagnets are configured to produce a magnetic field. The moving block is positioned at least partially within the rail assembly rack and the plurality of electromagnets are configured to induce a force on the moving block to direct the motion of the moving block through the rail assembly rack.

DETAILED DESCRIPTION

Figure 1:
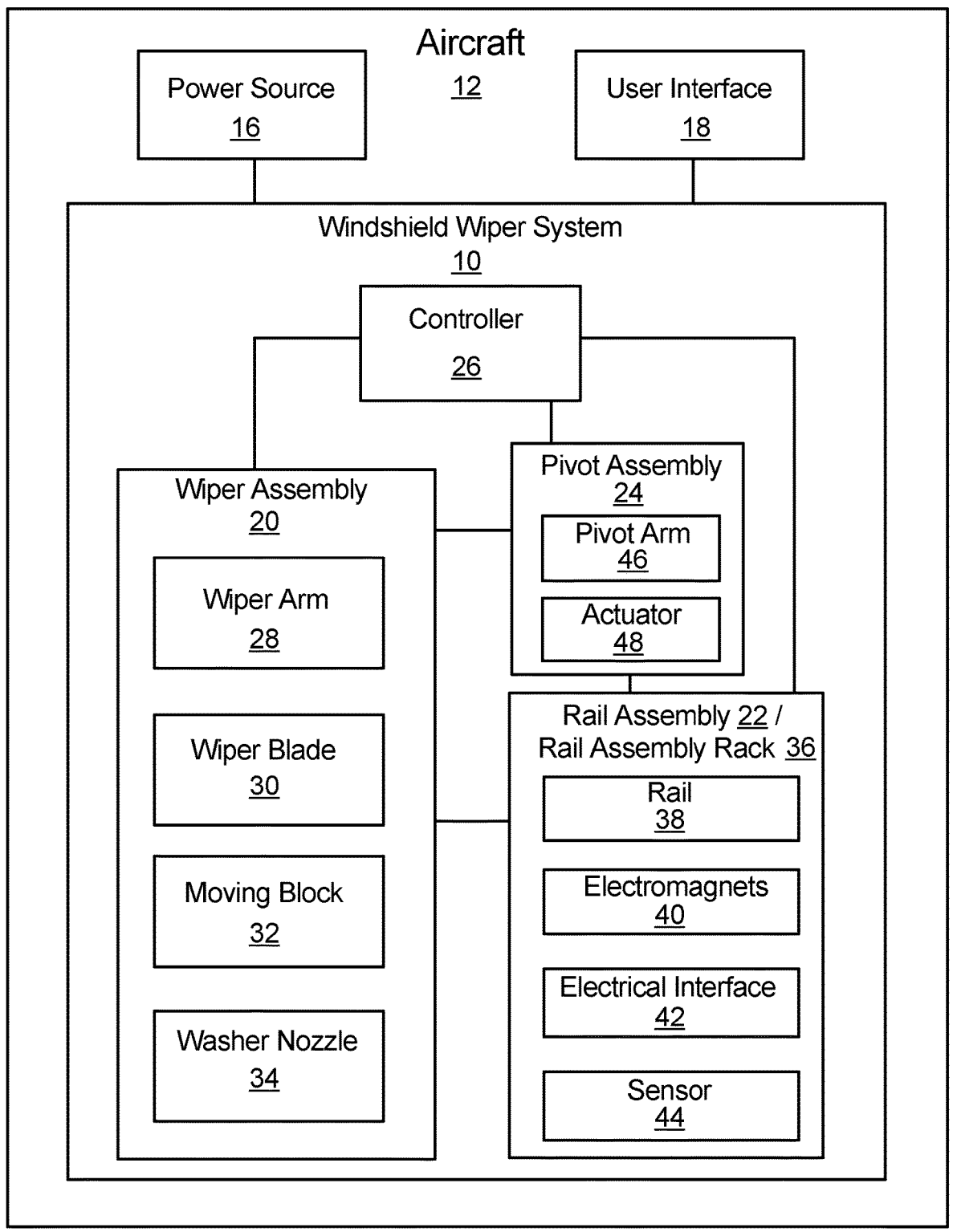
FIG. 1 is a schematic block diagram of a windshield wiper system for use on an aircraft.

FIG. 1 is a schematic block diagram of windshield wiper system 10 (hereinafter "system 10") for use on aircraft 12, more specifically for use on windshield 14 of aircraft 12. Aircraft 12 includes system 10, windshield 14 (FIG. 2A), power source 16, and user interface 18. Throughout the description, it is to be understood that aircraft 12 can be any vehicle that is able to fly through the air, such as an airplane or a helicopter. Power source 16 is a device or component onboard aircraft 12 that supplies electrical energy to aircraft 12. Power source 16 can be a battery, generator, alternator, auxiliary power unit, or other source of electrical energy onboard aircraft 12. User interface 18 can be any device or component that allows the user (pilot or co-pilot) to control operation of aircraft 12. User interface 18 can be a graphical user interface (GUI), a knob, a switch, a button, or any other device or component that allows the user to control operation of aircraft 12. Power source 16 and user interface 18 are both positioned onboard aircraft 12 and are coupled to system 10 through a wired or wireless connection.

System 10 is positioned onboard aircraft 12 and system 10 is configured to wipe and clean water or other debris from windshield 14 of aircraft 12, allowing better visibility out windshield 14 for both the pilot and co-pilot. System 10 includes wiper assembly 20, rail assembly 22, pivot assembly 24, and controller 26. As shown in FIG. 1, wiper assembly 20 includes wiper arm 28, wiper blade 30, moving block 32, and washer nozzle 34. Rail assembly 22 includes rail assembly rack 36, rail 38, plurality of electromagnets 40, electrical interface 42, and sensor 44. Pivot assembly 24 includes pivot arm 46 and actuator 48. Controller 26 is coupled to each of wiper assembly 20, rail assembly 22, and pivot assembly 24 through a wired or wireless connection. Controller 26 is configured to send and receive electrical signals or commands to and from each of wiper assembly 20, rail assembly 22, and pivot assembly 24, thereby controlling the operation of each of wiper assembly 20, rail assembly 22, and pivot assembly 24. Each of wiper assembly 20, rail assembly 22, and pivot assembly 24 will be discussed in greater detail with reference to FIGS. 2-4.

Controller 26 is coupled to power source 16 and controller 26 is configured to receive electrical power from power source 16. Controller 26 is also coupled to user interface 18 through a wired or wireless connection and controller 26 is configured to receive electrical signals or commands from user interface 18. For example, a user can interact with user interface 18 to activate system 10 to clear rain or debris from windshield 14 of aircraft 12. Upon activation by the user, a signal is sent from user interface 18 to controller 26, and then controller 26 sends a signal to wiper assembly 20, rail assembly 22, and/or pivot assembly 24 to activate operation of each respective assembly. In another example, controller 26 can receive signals from sensor 44 of rail assembly 22 indicating the need to activate system 10 based on environmental conditions. System 10 is positioned onboard aircraft 12 and system 10 is configured to wipe and clean water or other debris from windshield 14 of aircraft 12.

Figure 2A:
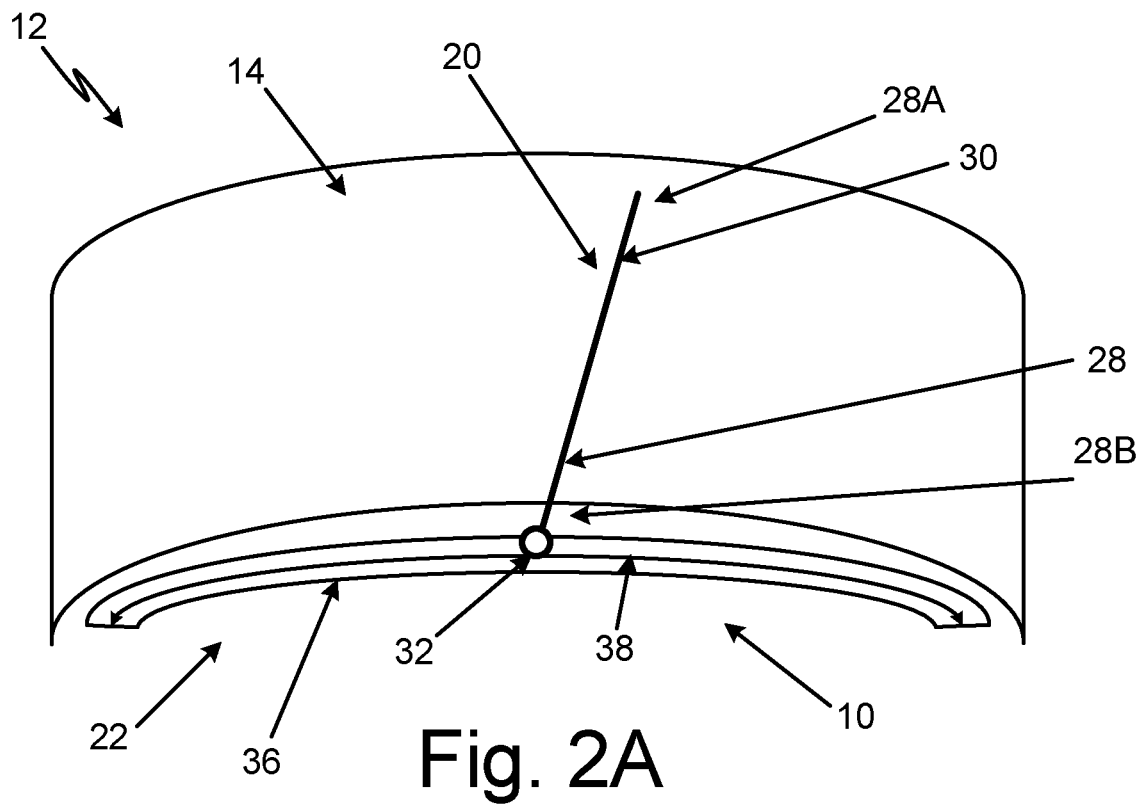
FIG. 2A is a front view of the windshield wiper system on a single windshield of an aircraft.
Figure 2B:
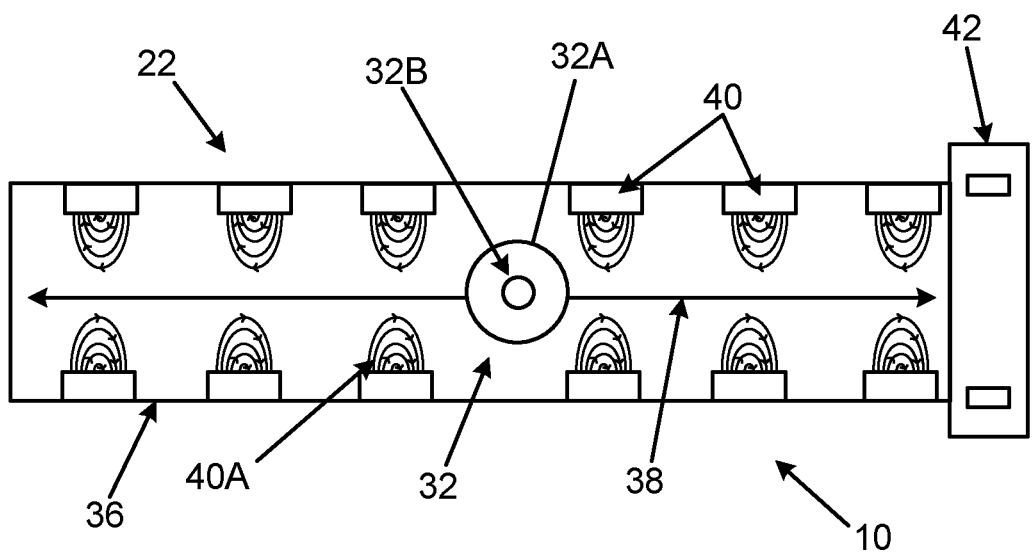
FIG. 2B is a top view of the windshield wiper system used with the single windshield of the aircraft.

FIG. 2A is a front view of system 10 on a single windshield 14 of aircraft 12. FIG. 2B is a top view of system 10 used with the single windshield 14 of aircraft 12. FIGS. 2A-2B will be discussed together. System 10 includes wiper assembly 20 and rail assembly 22. Wiper assembly 20 includes wiper arm 28, wiper blade 30, moving block 32, and washer nozzle 34 (FIG. 1). Rail assembly 22 includes rail assembly rack 36, rail 38, plurality of electromagnets 40, electrical interface 42, and sensor 44 (FIG. 1).

Wiper arm 28 includes first end 28A positioned at one end of wiper arm 28 and second end 28B positioned at the other end of wiper arm 28, opposite from first end 28A. Wiper arm 28 is configured to provide support to wiper blade 30, which is coupled to first end 28A of wiper arm 28. Wiper arm 28 can be constructed from a metallic, polymer, or composite material. Wiper blade 30 is coupled to first end 28A of wiper arm 28 and wiper blade 30 extends along a length of wiper arm 28. Wiper blade 30 is configured to press against windshield 14 and clear rain or other debris from windshield 14 of aircraft 12 as wiper blade 30 sweeps across windshield 14. Wiper blade 30 can be constructed from a rubber or other synthetic material. Washer nozzle 34 (FIG. 1) is coupled to wiper arm 28 and coupled to a tube which is connected to a washer fluid reservoir. Washer nozzle 34 is configured to spray washing fluid on windshield 14 of aircraft 12 to aid in cleaning windshield 14. Washer nozzle 34 can vary the amount of washer fluid sprayed depending upon the weather condition, speed of wiper arm 28, and atmospheric wind speed. Further, washer nozzle 34 can adjust the spray pressure of washing fluid depending upon the atmospheric pressure in which wiper assembly 20 is operating.

Moving block 32 is coupled to second end 28B of wiper arm 28 and moving block 32 is configured to secure and support wiper arm 28 with an attached wiper blade 30 during operation of system 10. As shown in FIG. 2B, moving block 32 includes core 32B surrounded by magnetic coil 32A. Core 32B of moving block 32 can be constructed from an iron or other ferromagnetic material susceptible to magnetization. Magnetic coil 32A is a series of loops or windings wrapped around core 32B and magnetic coil 32A is constructed from a conductive metal wire. Magnetic coil 32A can be constructed from a copper, silver, aluminum, or other metal capable of transmitting electricity through the metal wire. The combination of core 32B and magnetic coil 32A in moving block 32 allows moving block 32 to interact with and be influenced by magnetic fields. Moving block 32 is positioned at least partially within rail assembly rack 36 while wiper arm 28 and wiper blade 30 extend outward onto windshield 14 of aircraft 12.

Rail assembly 22 includes rail assembly rack 36, rail 38, plurality of electromagnets 40, electrical interface 42, and sensor 44 (FIG. 1). Rail assembly rack 36 is a cavity or channel positioned within the body of aircraft 12 adjacent windshield 14 and extending approximately the length or width of windshield 14 on aircraft 12. In the embodiment shown, rail assembly rack 36 is positioned below windshield 14 of aircraft 12. In another embodiment, rail assembly rack 36 can be positioned above windshield 14 of aircraft 12. Rail assembly rack 36 is a cavity or channel within the outer surface of aircraft 12 that is configured to house and secure other components of rail assembly 22. Rail assembly rack 36 can include actuating doors or a seal that protects the components within rail assembly rack 36 from the environment and inclement weather during flight and operation of system 10.

Rail 38 is positioned within rail assembly rack 36, and rail 38 extends along the length of rail assembly rack 36. Rail 38 can be a single guide rail, dual guide rail, or channel that is configured to guide moving block 32 through rail assembly rack 36 of rail assembly 22. Rail 38 guides moving block 32 through rail assembly rack 36 by providing a path for horizontally sweeping or traversing moving block 32 with an attached wiper arm 28 and wiper blade 30 across windshield 14 of aircraft 12. Sensor 44 (FIG. 1) is positioned within and coupled to rail assembly rack 36. Sensor 44 can be one or more of a pressure sensor, wind speed sensor, altitude sensor, temperature sensor, precipitation sensor, or any other environmental sensor. Sensor 44 is communicatively coupled to controller 26 through a wired or wireless connection, and sensor 44 is configured to transmit sensed data to controller 26 for storage and processing by controller 26. In one example, sensor 44 can transmit sensed data (such as altitude, temperature, pressure, wind speed, or sensed precipitation) to controller 26 indicating that controller 26 should activate system 10 and cause wiper assembly 20 to begin sweeping across windshield 14 of aircraft 12. In another example, sensor 44 can transmit sensed data to controller 26 to aid in the motion control of wiper assembly 20, such as the velocity, acceleration, or direction of wiper assembly 20.

Electrical interface 42 is positioned within and coupled to rail assembly rack 36. Electrical interface 42 is an electrical connection that is coupled to rail assembly rack 36 and configured to provide electrical energy to rail assembly rack 36. Electrical interface 42 is also coupled to power source 16 of aircraft 12 and electrical interface 42 is configured to receive electrical energy from power source 16 on aircraft 12. Electrical interface 42 is configured to receive electrical energy from power source 16 and then provide or transfer the electrical energy to rail assembly rack 36. Controller 26 is coupled to electrical interface 42 and controller 26 is configured to regulate the electrical energy that is provided to electrical interface 42. Further, controller 26 is configured to regulate the electrical energy provided from electrical interface 42 to rail assembly rack 36. Regulating the electrical energy provided to electrical interface 42 or rail assembly rack 36 comprises limiting or controlling the amount of electrical energy provided to each component as well as controlling the direction and intensity of the electrical current flowing through system 10. Electrical interface 42 is a component positioned between and electrically connecting power source 16 to rail assembly rack 36.

Plurality of electromagnets 40 are positioned within and coupled to rail assembly rack 36. More specifically, plurality of electromagnets 40 are spaced along a length of rail assembly rack 36 on both sides of rail assembly rack 36. In the embodiment shown, there are six electromagnets 40 on each side of rail assembly rack 36, with a total of twelve electromagnets 40 within rail assembly rack 36. In another embodiment, there can be more than or less than six electromagnets 40 on each side of rail assembly rack 36 and the total number of electromagnets 40 within rail assembly rack 36 can be more than or less twelve electromagnets 40. The number of electromagnets 40 on each side of rail assembly rack 36 and the total number of electromagnets 40 will vary depending on the size of the aircraft windshield. Each of the plurality of electromagnets 40 within rail assembly rack 36 is an electromagnet that is configured to receive electrical energy from rail assembly rack 36. The electrical energy received by each of the plurality of electromagnets 40 is transferred from power source 16 to electrical interface 42, from electrical interface 42 to rail assembly rack 36, and then from rail assembly rack 36 to each of the plurality of electromagnets 40. The transfer of electrical energy from power source 16 to the plurality of electromagnets 40 can be through any standard means, such as an electrical wire, electrical cable, or any other component capable of carrying and transferring an electric current from one component to another.

The electrical energy received by each of the plurality of electromagnets 40 causes each of the plurality of electromagnets 40 to produce magnetic field 40A around each one of the plurality of electromagnets 40. Magnetic field 40A produced by each of the plurality of electromagnets 40 interacts with and induces a force on moving block 32, directing the motion of moving block 32 through rail assembly rack 36. Each electromagnet 40 of the plurality of electromagnets 40 has a polarity that is opposite an adjacent electromagnet 40. In other words, the polarity of each electromagnet 40 alternates between a north pole and a south pole along the length of rail assembly rack 36. Further, each electromagnet 40 has a pole that is opposite the electromagnet 40 directly across rail assembly rack 36. The alternating poles of electromagnets 40 aids in producing magnetic field 40A that induces movement of moving block 32, allowing the plurality of electromagnets 40 to simultaneously push and pull (through attractive and repulsive magnetic forces) moving block 32 through rail assembly rack 36. More specifically, controller 26 is configured to alter an electric current provided to the plurality of electromagnets 40 to direct the motion of moving block 32 through rail assembly rack 36, discussed further below.

Further, magnetic field 40A produced by each of the plurality of electromagnets 40 counteracts the effects of gravitational acceleration and any other accelerations to cause magnetic levitation or magnetic suspension of moving block 32 within rail assembly rack 36. Magnetic levitation or magnetic suspension is defined as a method by which an object is suspended with no support other than magnetic fields. As such, magnetic levitation of moving block 32 within rail assembly rack 36 results in no or very minimal contact between moving block 32 and rail assembly rack 36 as moving block 32 travels through rail assembly rack 36. No or minimal contact between moving block 32 and rail assembly rack 36 achieves minimal to no friction between moving block 32 and rail assembly rack 36 and a smoother and more efficient system 10.

Controller 26 is coupled to electrical interface 42 and controller 26 is configured to regulate the electrical energy provided from electrical interface 42 to rail assembly rack 36. Regulating the electrical energy supplied to rail assembly rack 36 allows controller 26 to regulate the electrical energy supplied to each of the plurality of electromagnets 40. Regulating the electrical energy supplied to each of the plurality of electromagnets 40 allows controller 26 to control and alter the forces induced on moving block 32 from the plurality of electromagnets 40. In turn, this allows controller 26 to control the pushing and pulling of moving block 32 through rail assembly rack 36. Therefore, controller 26 is configured to alter the electrical energy provided to rail assembly rack 36 and each of the plurality of electromagnets 40 to control the motion of moving block 32 through rail assembly rack 36. Controlling of the motion of moving block 32 comprises controlling one or more of a velocity of moving block 32, direction of moving block 32, and acceleration of moving block 32.

More specifically, controller 26 is configured to monitor and adjust the electrical current flow through system 10 and rail assembly 22 to control movement of moving block 32. Controller 26 can direct electrical interface 42 to send a first electric current to the plurality of electromagnets 40 in a first direction through rail assembly rack 36, creating magnetic field 40A that forces moving block 32 to travel or traverse in a first direction through rail assembly rack 36. Controller 26 can also direct electrical interface 42 to send a second electric current to the plurality of electromagnets 40 in a second direction through rail assembly rack 36, creating magnetic field 40A that forces moving block 32 to travel or traverse in a second direction through rail assembly rack 36. As described, the first electrical current flows in a first direction through rail assembly rack 36 and the second electrical current flows in a second direction, opposite the first direction, through rail assembly rack 36. Likewise, the first direction that moving block 32 travels or traverses through rail assembly rack 36 is opposite in direction as the second direction that moving block 32 travels or traverses through rail assembly rack 36.

Supplying the first electrical current to the plurality of electromagnets 40 causes each electromagnet 40 to produce magnetic field 40A with a specific polarity. As discussed, each electromagnet 40 of the plurality of electromagnets 40 has a polarity that is opposite an adjacent electromagnet 40. In other words, the polarity of each electromagnet 40 alternates between a north pole and a south pole along the length of rail assembly rack 36. The specific orientation of the plurality of electromagnets 40 creates magnetic field 40A that pushes and/or pulls moving block 32 through rail assembly rack 36 in a first direction. Supplying the second electrical current to the plurality of electromagnets 40 causes each electromagnet 40 to produce magnetic field 40A with a polarity that is opposite the polarity of each electromagnet 40 when the first electrical current is supplied. For example, if one specific electromagnet 40 produces magnetic field 40A with a north polarity when the first electrical current is supplied, that same electromagnet 40 will produce magnetic field 40A with a south polarity when the second electrical current is supplied. As such, the polarity of each electromagnet 40 is configured to switch between a north polarity and a south polarity depending on the electrical current that is supplied, either the first electrical current or the second electrical current as described.

Therefore, changing the direction of the electrical current flowing through rail assembly rack 36 will change the direction in which moving block 32 travels or traverses through rail assembly rack 36. Further, controller 26 is configured to control the amount of electrical current that is supplied to the plurality of electromagnets 40. When moving block 32 is nearing the end of rail assembly rack 36, controller 26 will begin to limit the electrical current that is supplied to each of the plurality of electromagnets 40. Limiting the electrical current supply causes moving block 32 with the attached wiper arm 28 and wiper blade 30 to slow down and stop movement before reaching the end of rail assembly rack 36. Then the electrical current supplied to the plurality of electromagnets 40 is reversed and moving block 32 will begin to travel or traverse through rail assembly rack 36 in the opposite direction. The operation of changing the direction and amount of electrical current flowing to each of the plurality of electromagnets 40 continues throughout operation of system 10 to sweep wiper assembly 20 back and forth across windshield 14 of aircraft 12.

In operation, a pilot or co-pilot can interact with user interface 18 to activate system 10. Upon activation, a signal is sent from user interface 18 to controller 26, commanding controller 26 to adjust the electrical current being supplied to electrical interface 42. Electric current is transferred from power source 16 to electrical interface 42 and then from electrical interface 42 to rail assembly rack 36. The electric current continues to transfer from rail assembly rack 36 to the plurality of electromagnets 40. As discussed, the direction and amount of electrical current flowing to the plurality of electromagnets 40 dictates the acceleration, velocity, and direction in which moving block 32 travels or traverses through rail assembly rack 36. The pilot or co-pilot can then interact with user interface 18 to adjust parameters of system 10, such as to alter the velocity in which wiper assembly 20 sweeps across windshield 14 of aircraft 12 or to deactivate system 10 and stop the sweeping of wiper assembly 20. In another example, sensor 44 of rail assembly 22 can send sensed environmental data to controller 26 and controller 26 can store and process the data to automatically activate or deactivate system 10 depending on the environmental conditions outside of aircraft 12.

System 10 is configured to utilize magnet fields 40A to induce magnetic levitation and movement of wiper assembly 20 onboard aircraft 12 for clearing windshield 14 of water or other debris. System 10 is configured to reach and clear more of windshield 14 than traditional windshield wiper systems which only pivot about a single pivot point. System 10 can travel or traverse over a wider range across windshield 14 to clear more of windshield 14 of water or other debris, resulting in better visibility for both the pilot and co-pilot. System 10 uses magnetic fields 40A and magnetic levitation to reduce friction associated with interacting mechanical components of traditional wiper systems, resulting in lower operating power consumption compared to traditional wiper systems. Further, utilization of magnetic fields 40A creates a system the requires less maintenance and therefore less maintenance costs than traditional wiper systems used on aircrafts. System 10 is an efficient windshield wiper system that cleans a wider area of an aircraft windshield, creating a better field of view for both the pilot and co-pilot.

Figure 3A:
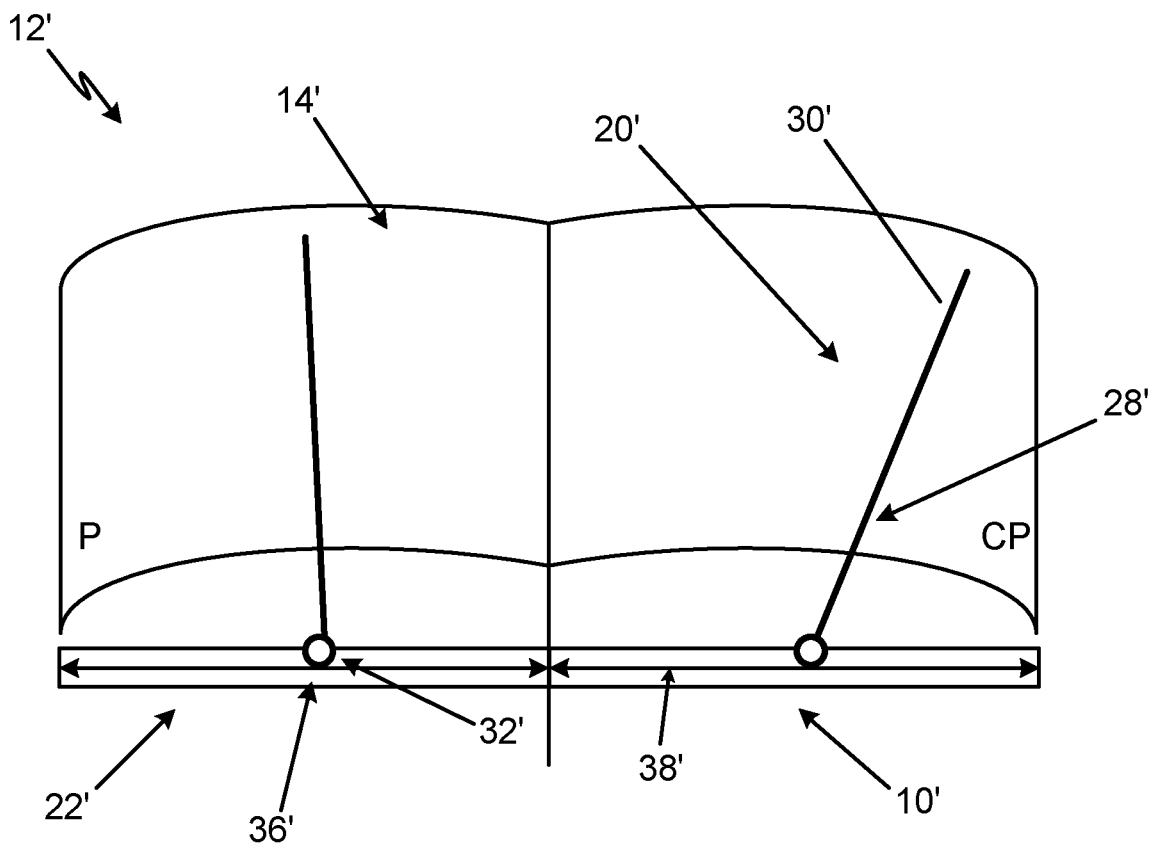
FIG. 3A is a front view of the windshield wiper system on a dual windshield of an aircraft.
Figure 3B:
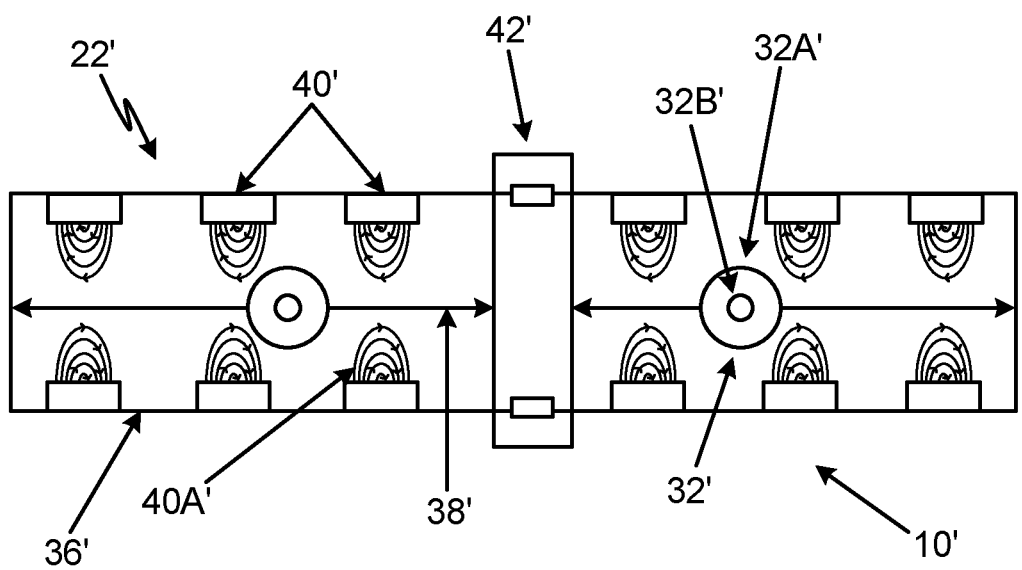
FIG. 3B is a top view of the windshield wiper system used with the dual windshield of the aircraft.

FIG. 3A is a front view of system 10' on a dual windshield 14' of aircraft 12'. FIG. 3B is a top view of system 10' used with the dual windshield 14' of aircraft 12'. FIGS. 3A-3B will be discussed together. System 10' includes wiper assembly 20' and rail assembly 22'. Wiper assembly 20' includes wiper arm 28', wiper blade 30', moving block 32', and washer nozzle 34' (FIG. 1). Rail assembly 22' includes rail assembly rack 36', rail 38', plurality of electromagnets 40', electrical interface 42', and sensor 44' (FIG. 1). The components, assemblies, and operation of the assemblies shown in FIGS. 3A-3B are almost identical as the components, assemblies, and operation of the assemblies shown in FIGS. 2A-2B. As such, the components, assemblies, and operation of the assemblies shown in FIGS. 3A-3B will not be discussed again in detail. Reference the detailed description provided above for an understanding of how the components, assemblies, and operation of the assemblies are utilized to clear water or other debris from windshield 14' of aircraft 12'.

System 10 of FIGS. 2A-2B differs from system 10' of FIGS. 3A-3B in that system 10' is used in conjunction with a dual windshield 14'. System 10' includes all the same components as system 10, with each component being mirrored about electrical interface 42' so that both sides of the dual windshield 14' can be cleared of rain or other debris. System 10' is used on an aircraft 12' that includes a dual windshield 14' instead of a single windshield 14. Each side of system 10' operates as described with reference to FIGS. 2A-2B. Wiper assembly 20' on each side of the dual windshield 14' can operate independently or mutually with the wiper assembly 20' positioned on the other side of the dual windshield 14'. In one example, the wiper assemblies 20' on each side of the dual windshield 14' can sweep across windshield 14' in parallel motion, meaning each wiper assembly 20' sweeps across windshield 14' in the same direction and velocity as the other wiper assembly 20'. In another example, the wiper assemblies 20' on each side of the dual windshield 14' can sweep across windshield 14' independently. Meaning each wiper assembly 20' sweeps across windshield 14' without reference to the other wiper assembly 20' (not in the same direction and velocity as the other wiper assembly 20'). System 10' is configured to clear water or other debris from the dual windshield 14' of aircraft 12'

Figure 4A:
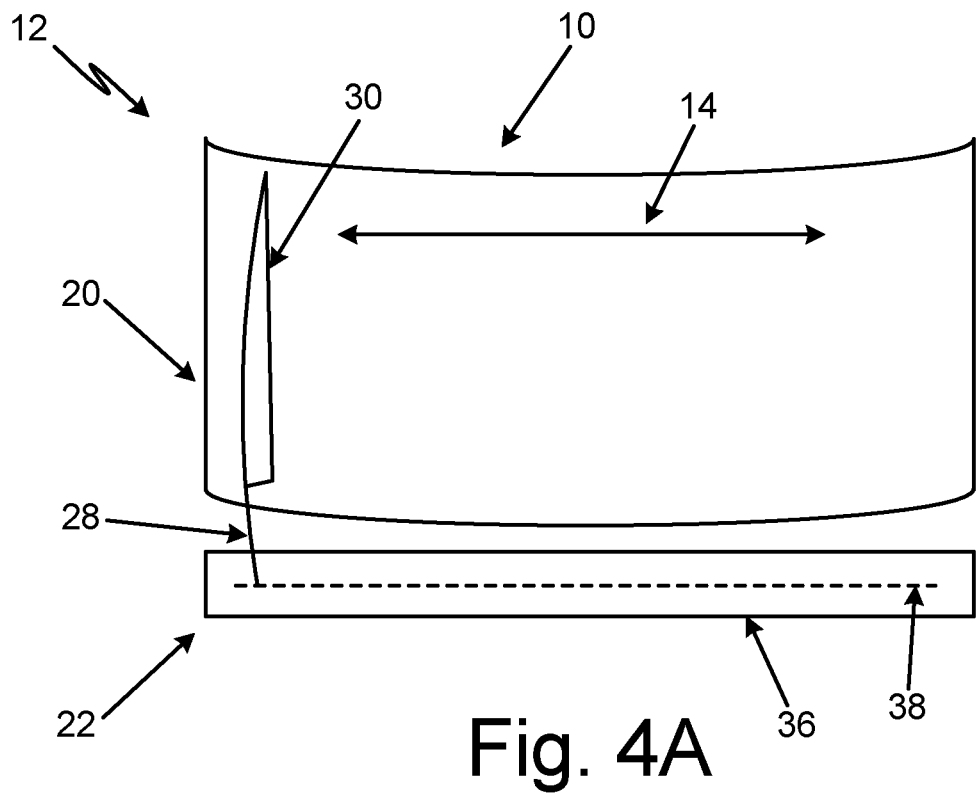
FIG. 4A is a front view of a first parking position of the windshield wiper system.
Figure 4B:
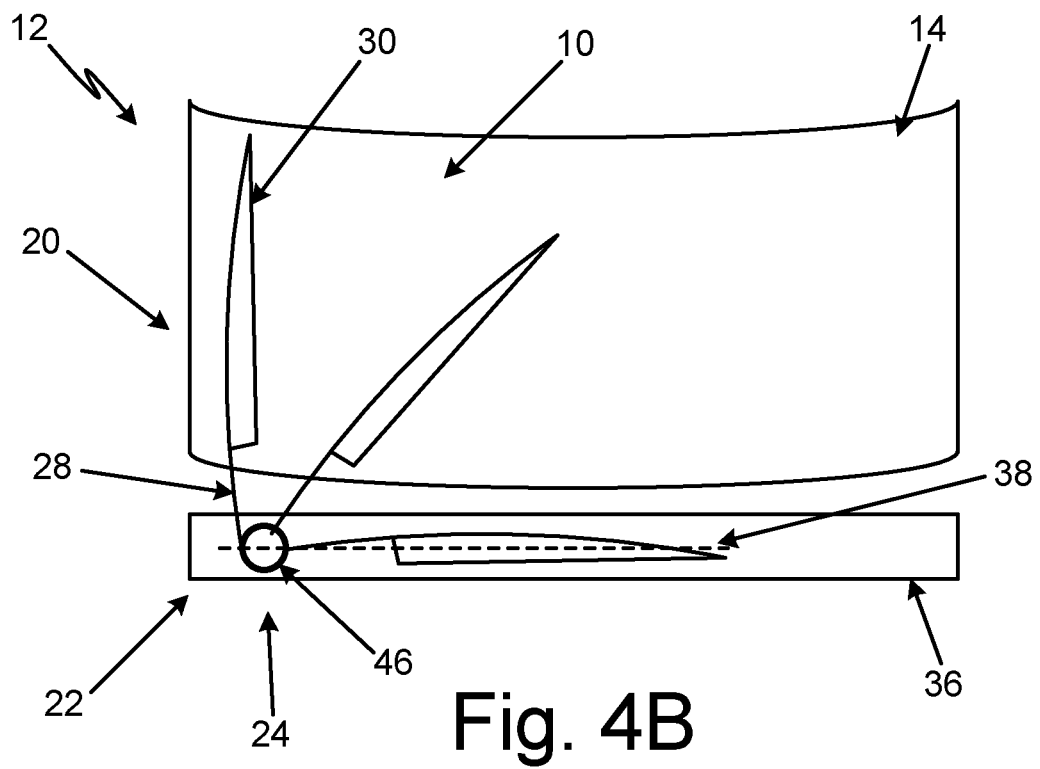
FIG. 4B is a front view of a second parking position of the windshield wiper system.

FIG. 4A is a front view of a first parking position of system 10. FIG. 4B is a front view of a second parking position of system 10. FIGS. 4A-4B will be discussed together. As shown in FIGS. 4A and 4B, aircraft 12 includes windshield 14 and windshield wiper system 10 which includes wiper assembly 20, rail assembly 22, and pivot assembly 24. Wiper assembly 20 includes wiper arm 28, wiper blade 30, and moving block 32 (not shown). Rail assembly 22 includes rail assembly rack 36 and rail 38. Pivot assembly 24 includes pivot arm 46 and actuator 48. The components and operation of wiper assembly 20 and rail assembly 22 are discussed earlier with respect to FIGS. 2A-2B and will not be discussed in detail with reference to FIGS. 4A-4B FIG. 4A is a front view of a first parking position of system 10, more specifically a first parking position of wiper assembly 20 on windshield 14 of aircraft 12. The first parking position of wiper assembly 20 is a position in which wiper assembly 20 remains situated when system 10 is deactivated and not in use. As shown in FIG. 4A, when wiper assembly 20 is in the first parking position, wiper blade 30 of wiper assembly 20 remains situated on windshield 14 in an upright position. More specifically, when wiper assembly 20 is in the first parking position, wiper assembly 20 is in an extended positioned in which wiper assembly 20 is non-parallel with respect to rail assembly rack 36. Further, when wiper assembly 20 is in the first parking position, wiper assembly 20 is positioned at the farthest limits (on either side) of rail assembly rack 36. Wiper assembly 20 is positioned at the farthest limits of rail assembly rack 36 to limit the obstruction of view for both the pilot and co-pilot, depending on which side wiper assembly 20 is positioned. Wiper assembly 20 remains in the first parking position while system 10 is deactivated, and wiper assembly 20 will only leave the first parking position once system 10 is activated.

FIG. 4B is a front view of a second parking position of system 10, more specifically a second parking position of wiper assembly 20 onboard aircraft 12. As shown in FIG. 4B, pivot assembly 24 includes pivot arm 46 and actuator 48. Pivot arm 46 is coupled to second end 28B of wiper arm 28 and actuator 48 is coupled to an end of pivot arm 46. Pivot arm 46 and actuator 48 are positioned within rail assembly rack 36 and actuator 48 is coupled to rail assembly rack 36. Actuator 48 is a rotational actuator that is configured to rotate pivot arm 46 with the attached wiper assembly 20 from a stowed positioned to an extended position. Wiper assembly 20 is in the stowed position when wiper assembly 20 is deactivated and not sweeping across windshield 14 of aircraft 12. Further, wiper assembly 20 is positioned within rail assembly rack 36 when wiper assembly 20 is in the stowed position. Positioning wiper assembly 20 within rail assembly rack 36 protects wiper assembly 20 from environmental elements when wiper assembly 20 is not in use. Wiper assembly 20 is in the extended position when wiper assembly 20 is positioned on and adjacent windshield 14 and wiper assembly 20 is ready to sweep across windshield 14 of aircraft 12. Controller 26 is coupled to actuator 48 of pivot assembly 24 to direct actuator 48 to rotate pivot arm 46 about a pivot point to switch between the stowed position and the extended position. In operation, a command is sent from controller 26 to actuator 48, causing actuator 48 to activate and rotate pivot arm 46 with an attached wiper assembly 20. Pivot assembly 24 is configured to allow wiper assembly 20 to rotate and be stowed within rail assembly rack 36 when not in use, protecting wiper assembly 20 and extending the useful life of wiper assembly 20.

DISCUSSION OF POSSIBLE EMBODIMENTS

The following are non-exclusive descriptions of possible embodiments of the present invention.

A windshield wiper system, for use on a windshield of an aircraft, includes a wiper assembly and a rail assembly. The wiper assembly includes a wiper arm, a wiper blade, and a moving block. The wiper blade is coupled to a first end of the wiper arm and the moving block is coupled to a second end of the wiper arm. The rail assembly includes a rail assembly rack, an electrical interface coupled to the rail assembly rack, and a plurality of electromagnets positioned within and coupled to the rail assembly rack. The electrical interface is configured to provide electrical energy to the plurality of electromagnets and the plurality of electromagnets are configured to produce a magnetic field. The moving block is positioned at least partially within the rail assembly rack and the plurality of electromagnets are configured to induce a force on the moving block to direct the motion of the moving block through the rail assembly rack.

The windshield wiper system of the preceding paragraph can optionally include, additionally and/or alternatively, any one or more of the following features, configurations and/or additional components:

The moving block includes a core surrounded by a magnetic coil, and wherein the moving block is configured to interact with and be influenced by the magnetic field produced by the plurality of electromagnets.

The core of the moving block is constructed from a ferromagnetic material to enhance or amplify the force induced on the moving block by the magnetic field.

The plurality of electromagnets are spaced along a length of the rail assembly rack.

Each of the plurality of electromagnets is configured to receive electrical energy from the electrical interface through the rail assembly rack.

Each electromagnet of the plurality of electromagnets is configured to produce a magnetic field.

Each electromagnet has a polarity that is opposite the adjacent electromagnet, and wherein the polarity of each electromagnet alternates between a north pole and a south pole along a length of the rail assembly rack.

The magnetic field produced by each electromagnet is configured to induce a force on the moving block to cause magnetic levitation of the moving block within the rail assembly rack.

A controller coupled to the rail assembly, wherein the controller is configured to alter an electric current provided to the plurality of electromagnets to direct the motion of the moving block through the rail assembly rack.

Directing the motion of the moving block comprises changing one or more of a velocity of the moving block, direction of the moving block, and acceleration of the moving block.

Directing the motion of the moving block comprises: supplying a first electric current to the plurality of electromagnets, creating a magnetic field that forces the moving block to travel in a first direction through the rail assembly rack; and supplying a second electric current to the plurality of electromagnets, creating a magnetic field that forces the moving block to travel in a second direction through the rail assembly rack, opposite the first direction; wherein the direction of the second electric current is opposite the direction of the first electric current.

The rail assembly further comprises a sensor positioned within and coupled to the rail assembly rack, and wherein the sensor collects environmental data and transmits the environmental data to a controller for storage and processing.

The sensor is one or more of a pressure sensor, wind speed sensor, altitude sensor, temperature sensor, or precipitation sensor.

A rail positioned within the rail assembly rack, wherein the rail is configured to guide the moving block through the rail assembly rack.

A pivot assembly comprising a pivot arm and an actuator, wherein the pivot arm is coupled to the second end of the wiper arm and the actuator is coupled to the pivot arm, and wherein the actuator is a rotational actuator configured to rotate the pivot arm with the attached wiper assembly from a stowed position to an extended position.

The wiper assembly is positioned non-parallel to the rail assembly rack when in the extended position.

The wiper assembly is positioned parallel to the rail assembly rack and positioned within the rail assembly rack when in the stowed position.

The rail assembly rack is positioned above the windshield of the aircraft.

The rail assembly rack is positioned below the windshield of the aircraft.

The electrical interface receives electrical energy from an electrical power source, and wherein the electrical power source is one or more of a battery, a generator, an alternator, and an auxiliary power unit.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A windshield wiper system for use on a windshield of an aircraft, the windshield wiper system comprising:

a wiper assembly comprising a wiper arm, a wiper blade, and a moving block, wherein the wiper blade is coupled to a first end of the wiper arm and the moving block is coupled to a second end of the wiper arm; and a rail assembly comprising a rail assembly rack, an electrical interface coupled to the rail assembly rack, and a plurality of electromagnets positioned within and coupled to the rail assembly rack, wherein the electrical interface is configured to provide electrical energy to the plurality of electromagnets and the plurality of electromagnets are configured to produce a magnetic field;

wherein the moving block is positioned at least partially within the rail assembly rack and the plurality of electromagnets are configured to induce a force on the moving block to direct motion of the moving block through the rail assembly rack.

2. The windshield wiper system of claim 1, wherein the moving block includes a core surrounded by a magnetic coil, and wherein the moving block is configured to interact with and be influenced by the magnetic field produced by the plurality of electromagnets.

3. The windshield wiper system of claim 2, wherein the core of the moving block is constructed from a ferromagnetic material to enhance or amplify the force induced on the moving block by the magnetic field.

4. The windshield wiper system of claim 1, wherein the plurality of electromagnets are spaced along a length of the rail assembly rack.

5. The windshield wiper system of claim 1, wherein each of the plurality of electromagnets is configured to receive electrical energy from the electrical interface through the rail assembly rack.

6. The windshield wiper system of claim 1, wherein each electromagnet of the plurality of electromagnets is configured to produce a magnetic field.

7. The windshield wiper system of claim 6, wherein each electromagnet has a polarity that is opposite the adjacent electromagnet, and wherein the polarity of each electromagnet alternates between a north pole and a south pole along a length of the rail assembly rack.

8. The windshield wiper system of claim 6, wherein the magnetic field produced by each electromagnet is configured to induce a force on the moving block to cause magnetic levitation of the moving block within the rail assembly rack.

9. The windshield wiper system of claim 1, and further comprising a controller coupled to the rail assembly, wherein the controller is configured to alter an electric current provided to the plurality of electromagnets to direct the motion of the moving block through the rail assembly rack.

10. The windshield wiper system of claim 9, wherein directing the motion of the moving block comprises changing one or more of a velocity of the moving block, direction of the moving block, and acceleration of the moving block.

11. The windshield wiper system of claim 9, wherein directing the motion of the moving block comprises:
supplying a first electric current to the plurality of electromagnets, creating a magnetic field that forces the moving block to travel in a first direction through the rail assembly rack; and
supplying a second electric current to the plurality of electromagnets, creating a magnetic field that forces the moving block to travel in a second direction through the rail assembly rack, opposite the first direction;
wherein the direction of the second electric current is opposite the direction of the first electric current.

12. The windshield wiper system of claim 1, wherein the rail assembly further comprises a sensor positioned within and coupled to the rail assembly rack, and wherein the sensor collects environmental data and transmits the environmental data to a controller for storage and processing.

13. The windshield wiper system of claim 12, wherein the sensor is one or more of a pressure sensor, wind speed sensor, altitude sensor, temperature sensor, or precipitation sensor.

14. The windshield wiper system of claim 1 and further comprising a rail positioned within the rail assembly rack, wherein the rail is configured to guide the moving block through the rail assembly rack.

15. The windshield wiper system of claim 1 and further comprising a pivot assembly comprising a pivot arm and an actuator, wherein the pivot arm is coupled to the second end of the wiper arm and the actuator is coupled to the pivot arm, and wherein the actuator is a rotational actuator configured to rotate the pivot arm with the attached wiper assembly from a stowed position to an extended position.

16. The windshield wiper system of claim 15, wherein the wiper assembly is positioned non-parallel to the rail assembly rack when in the extended position.

17. The windshield wiper system of claim 15, wherein the wiper assembly is positioned parallel to the rail assembly rack and positioned within the rail assembly rack when in the stowed position.

18. The windshield wiper system of claim 1, wherein the rail assembly rack is positioned above the windshield of the aircraft.

19. The windshield wiper system of claim 1, wherein the rail assembly rack is positioned below the windshield of the aircraft.

20. The windshield wiper system of claim 1, wherein the electrical interface receives electrical energy from an electrical power source, and wherein the electrical power source is one or more of a battery, a generator, an alternator, and an auxiliary power unit.

* * * * *